UNITED STATES PATENT OFFICE.

ADOLF GENTZSCH, OF VIENNA, AUSTRIA-HUNGARY.

PROCESS OF RAISING THE MELTING-POINT OF RESINS, WAXES, AND SIMILAR BODIES.

SPECIFICATION forming part of Letters Patent No. 657,696, dated September 11, 1900.

Application filed August 18, 1899. Serial No. 727,688. (No specimens.)

*To all whom it may concern:*

Be it known that I, ADOLF GENTZSCH, a subject of the Emperor of Austria-Hungary, and a resident of Vienna, Austria-Hungary, have invented a new and useful Process for Raising the Point of Fusion or Preventing the Liquefaction of Resins, Wax and Wax-Like Substances, Pitch, and Tar, of which the following is a specification.

This invention has for its object to prevent resins, wax and the like, pitch, and tar (which each have their own particular melting-point) from being in a liquid state at the temperature at which they ordinarily melt or assume a mobile liquid condition or even at a higher temperature. This is of considerable importance in various industrial applications of these materials, and in particular in cases where they are to be mixed with other substances having a considerably-higher melting-point. By my present invention I am enabled so to alter the properties of each of the above-mentioned substances that they will never assume the mobile liquid condition—that is to say, when heated to a high temperature they will still remain in a toughly-viscous state, so that they can hardly be stirred about. For the purposes of my invention each of the said substances is heated in a suitable receptacle to a temperature of from 100° to 200° centigrade, so that it assumes a mobile liquid form. Water is then allowed to fall from a suitable height drop by drop into the hot mass, which is stirred up from time to time. The faster the water is allowed to drop the more rapidly will the operation be completed; but care has to be taken that, on the one hand, the temperature of the mass does not decrease and, on the other hand, that the drops do not unite to form a stream. The duration of the operation can be still further shortened if there be added to the water an excess of those substances that are generally contained in water, as determined by analysis—such as the carbonates of lime and magnesia, magnesium hydroxid, sulfate of lime, and oxid of iron. It is of advantage to provide the water-tank from which the water is supplied with a suitable stirring apparatus, by which the solution of the said substances is maintained at the point of saturation. The drops of water falling onto the hot mass are at once converted into steam and cause the liquid mass to become more and more viscous. When the required degree of viscosity has been attained, the supply of water is stopped and the mass is heated for some time longer to insure the removal of all aqueous particles.

With regard to the proportions to be employed for the chemicals to be added, it is somewhat difficult to give positive information, because, on the one hand, this depends upon the degree of the raising of the melting-point and, on the other hand, when adding small quantities the process lasts longer if the melting-point is wanted to be raised highly. It may, however, nevertheless be mentioned that, for instance, asphaltum with an addition of three per cent. of the materials named will be already thus strictly liquid that with a temperature of 200° centigrade it will, but with efforts, be possible to stir the mass. Waxes, tars, and the resins require some larger addition, varying between four to eight per cent. With regard to the length of time of the process, it cannot, for the same reasons, be positively stated, as the longer the process lasts the higher will be the melting-point. It can, nevertheless, be supposed that the maximum of the length of time for the treatment might be about twenty-four hours.

Under "tar" both kinds of tar—wood-tar and coal-tar—are understood. Both kinds can thus be treated. Under "pitch" vegetable pitch only is understood. Under "waxes" not only vegetable waxes, but mineral waxes also, especially earth-waxes and ozocerites, should be understood.

For carrying out my improved process I may employ the apparatus shown in my Patent No. 538,828, dated May 7, 1895.

No inflexible rule may be laid down for the amount of water to be used; but an average or approximate amount would be about one kilo of water for about five kilos of material.

The slower the drops of water fall the longer the process will last; but in no case should the water be allowed to fall fast enough to result in a continuous stream instead of individual drops.

Having now particularly described and ascertained the nature of this invention and in what manner the same is to be performed, I declare that what I claim is—

The process for raising the melting-point of resins, wax and wax-like substances, pitch and tar, or for preventing these from assuming the mobile liquid condition, which consists in causing water, either alone or with an addition of substances such as the carbonates of lime and magnesia, magnesium hydroxid, sulfate of lime or oxid of iron, to fall drop by drop onto the said substances while heated to above 100° centigrade until the mass has assumed a viscous condition, substantially as described.

In witness whereof I have hereunto set my hand in presence of two witnesses.

ADOLF GENTZSCH.

Witnesses:
ALVESTO S. HOGUE,
AUGUST FUGGER.